United States Patent Office 2,753,358
Patented July 3, 1956

2,753,358

PREPARATION OF DELTA-FURFURYLIDENE LEVULINIC ACID

Theodore E. Bockstahler, Moorestown, N. J., assignor to Rohm & Haas Company, Philadelphia, Pa., a corporation of Pennsylvania No Drawing. Application December 17, 1952,
Serial No. 326,611

3 Claims. (Cl. 260—347.3)

This invention relates to an improved process for the preparation of delta-furfurylidene levulinic acid having the formula

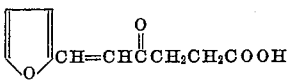

The compound itself has long been known (Hofacker et al., Berichte, 28, page 917 (1895)) but it has ordinarily been obtained in relatively low yields in association with large amounts of its beta-isomer and beta, delta-difurfurylidene levulinic acid. Consequently, the main object of this invention is to provide an improved process which yields maximum amounts of delta-furfurylidene levulinic acid and minor amount, if any, of the by-products normally expected. A further object is to obtain delta-furfurylidene levulinic acid of a high degree of purity so that it can be converted into sebacic acid for which the industrial demand is currently very high.

The process of this invention comprises reacting furfural and an alkali metal salt of levulinic acid, preferably sodium levulinate, at a temperature from about 0° to about 50° C., and preferably from about 15° to about 30° C. in the presence of a saturated aqueous solution of an alkali metal salt of a strong inorganic acid, which solution also contains an alkali metal hydroxide, preferably sodium or potassium hydroxide. For reasons of economy and efficiency, sodium chloride is ordinarily used in preparing the saturated salt solution but other alkali metal salts such as sodium sulfate, potassium chloride and potassium sulfate can also be employed. Under these conditions, the alkali metal salt of delta-furfurylidene levulinic acid is readily formed and since it is insoluble in the aqueous phase, it precipitates and is thereafter separated by conventional means such as filtration. It is next washed free of any by-products, such as its beta-isomer, by means of a saturated aqueous solution of an alkali metal salt of a strong mineral acid, again preferably a saturated solution of sodium chloride. Then the salt is suspended in water since its solubility in water is of the order of a few per cent and is converted to delta-furfurylidene levulinic acid by treatment with a strong mineral acid such as hydrochloric acid or sulfuric acid, after which the precipitated acid is removed.

It is recommended that an excess of the alkali metal levulinate over the stoichiometrical amount be employed. From three to five moles of levulinate per mole of furfural gives good results. Even greater ratios can be employed since any unreacted alkali metal levulinate can be most easily removed. Although the reactants and the aqueous reaction medium can be mixed at the outset, it is preferred to add the furfural slowly to the well agitated mixture of the other materials.

The reaction which is mildly exothermic proceeds well within the temperature range of 0° to 50° C. Above 50° C. the rate of reaction is very fast and the yield of the desired delta-furfurylidene levulinic acid falls off while the beta-isomer, the beta, delta-difurfurylidene levulinic acid and polymers form in increasing amounts.

The presence of sodium hydroxide or potassium hydroxide definitely serves to accelerate the rate of reaction and for this purpose from 0.5% to 4%, but preferably from about 1% to 2%, based on the total weight of the reaction mixture, is employed.

Thorough washing of the salt of delta-furfurylidene levulinic acid with a saturated solution of an alkali metal salt, preferably of sodium chloride, is extremely important since it provides a means of removing any occluded by-products without dissolving the delta-furfurylidene levulinate. Washing with water alone is impractical since some of the desired product, as well as the contaminants, is dissolved and thereby lost.

The conversion of the alkali metal salt to the delta-furfurylidene levulinic acid per se is most readily carried out by merely acidifying a suspension of the sodium salt. The delta-furfurylidene levulinic acid which precipitates is separated by conventional means such as filtration after which it can be recrystallized if desired.

The following example illustrates the preferred embodiment of this invention.

*Example*

Into a three-necked flask equipped with thermometer and mechanical stirrer was charged 580 grams (5 moles) of levulinic acid. Stirring was begun and continued vigorously throughout the entire procedure. The levulinic acid was neutralized by the cautious addition of 200 grams (5 moles) of sodium hydroxide dissolved in 750 ml. of a saturated aqueous solution of sodium chloride. Forty grams of solid sodium chloride was added followed by the addition of a solution of 25 grams of sodium hydroxide in 100 ml. of saturated sodium chloride solution. The temperature was maintained at 25° C. while 96 grams (1 mole) of furfural was added to the agitated mixture. Over the period of the next half-hour, the mixture gradually thickened as the sodium delta-furfurylidene levulinate formed and precipitated. The mixture was stirred at 25° C. for an additional hour after which it was filtered. The residue was thoroughly washed with several portions of saturated sodium chloride solution after which it was suspended in water and treated slowly with 200 ml. of an 18% solution of hydrochloric acid. The precipitate which formed was washed free of sodium chloride with water and was dried in air. A 70% yield of delta-furfurylidene levulinic acid was obtained, whose structure was confirmed by analysis. It melted at 113° C. (recorded value is 115° C.).

I claim:

1. A process for preparing delta-furfurylidene levulinic acid which comprises reacting furfural and more than a stoichiometrical amount of an alkali metal levulinate at a temperature from about 0° C. to about 50° C. in the presence of a saturated aqueous solution of an alkali metal salt of a strong mineral acid, said solution also containing from about 0.5% to about 4%, based on the weight of the entire reaction mixture, of an alkali metal hydroxide, removing the resultant precipitated alkali metal salt of delta-furfurylidene levulinic acid, washing said salt with a saturated aqueous solution of an alkali metal salt of a strong mineral acid, suspending the washed salt in water and acidifying the solution whereupon delta-furfurylidene levulinic acid is precipitated, and separating said precipitated acid.

2. A process for preparing delta-furfurylidene levulinic acid which comprises reacting furfural and sodium levulinate, in a ratio of at least three moles of the latter to one mole of the former, at a temperature from about 0° C. to about 50° C. in the presence of a saturated aqueous solution of sodium chloride, said solution also containing from about 0.5% to about 4% sodium hydroxide, based on the weight of the entire reaction mixture, removing the resultant precipitated sodium salt of delta-furfurylidene levulinic acid, washing said salt with a saturated aqueous solution of sodium chloride, suspending the washed salt in water and acidifying the solution whereupon delta-furfurylidene levulinic acid is precipitated, and separating said precipitated acid.

3. A process for preparing delta-furfurylidene levulinic acid which comprises reacting furfural and sodium levulinate, in a ratio of at least three moles of the latter to one mole of the former, at a temperature from about 15° C. to about 30° C. in the presence of a saturated aqueous solution of sodium chloride, said solution also containing from about 1% to about 2% sodium hydroxide, based on the weight of the entire reaction mixture, removing the resultant precipitated sodium salt of delta-furfurylidene levulinic acid, washing said salt with a saturated aqueous solution of sodium chloride, suspending the washed salt in water and acidifying the solution whereupon delta-furfurylidene levulinic acid is precipitated, and separating said precipitated acid.

References Cited in the file of this patent

Levulinic Acid, Morton, Scientific Report Series, Sugar Research Foundation, Aug. 1947, p. 14.
Ludwig et al.: Ber. 24, 2776, (1891).
Kleberg: Ber. 26, 349 (1893).
Hofacher: Ber. 28, 919 (1895).
Erdman: Ber. 24, 3201 (1891).
Beilstein, XVIII, Vierte Auflage (1934), p. 417.
Kehrer et al.: Ann. 294, 165 (1897).